July 31, 1962 J. F. MACHEN 3,046,894
METERING PUMP MECHANISM
Filed Jan. 27, 1960 4 Sheets-Sheet 1
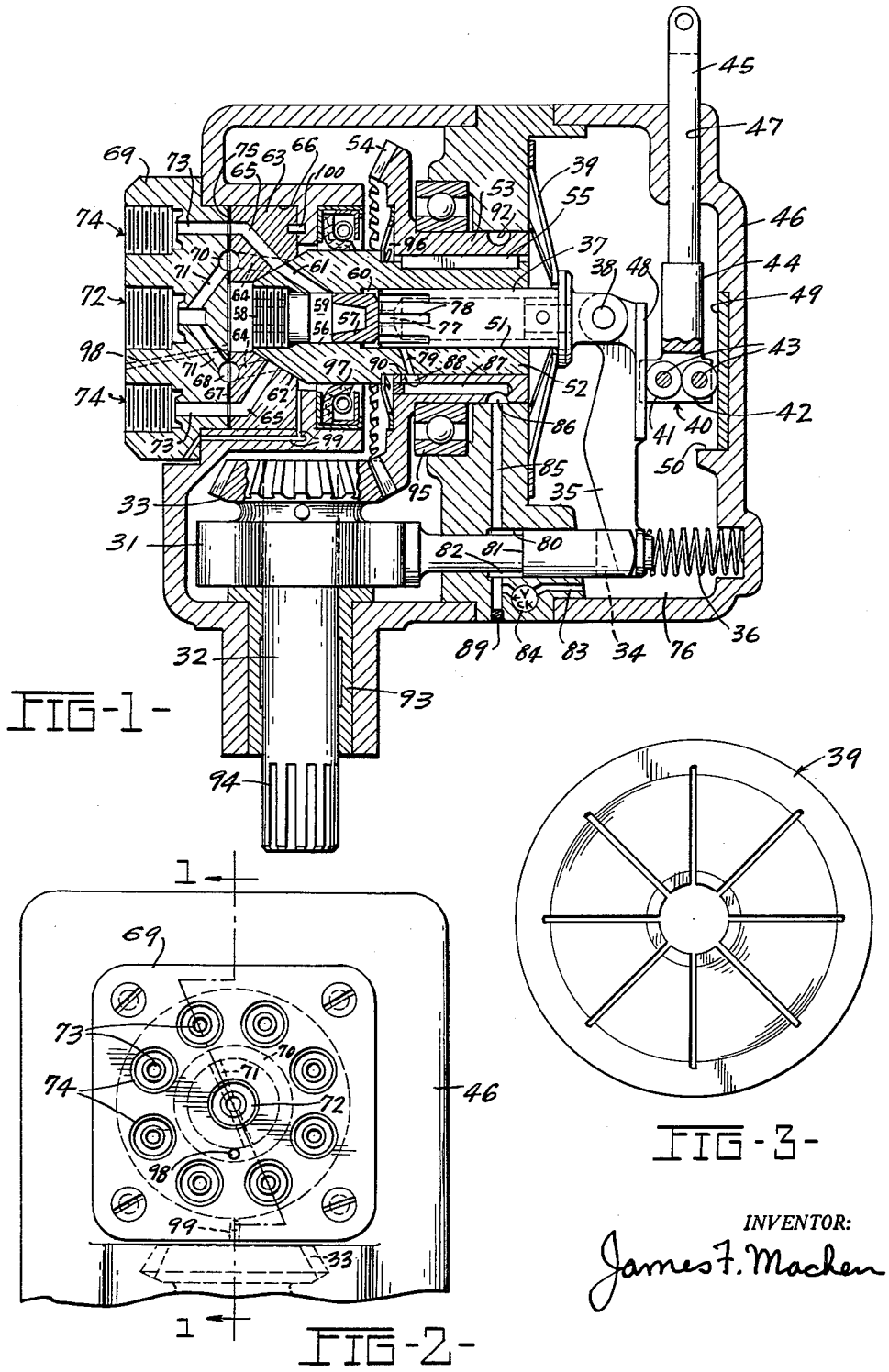
INVENTOR:
James F. Machen July 31, 1962 J. F. MACHEN 3,046,894
METERING PUMP MECHANISM
Filed Jan. 27, 1960 4 Sheets-Sheet 2
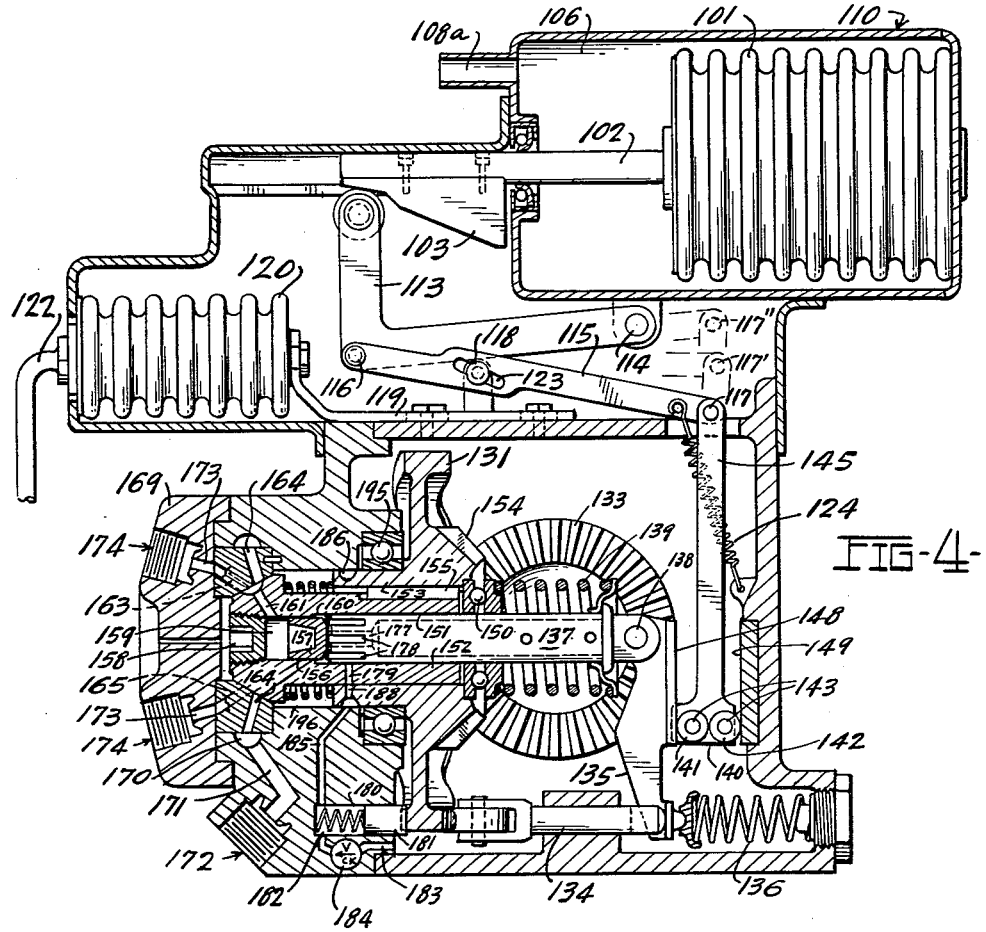
FIG-4-
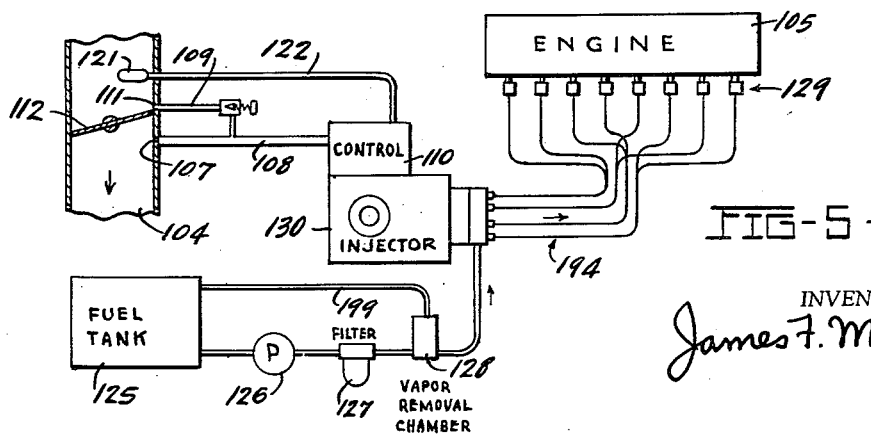
FIG-5-
INVENTOR:
James F. Machen

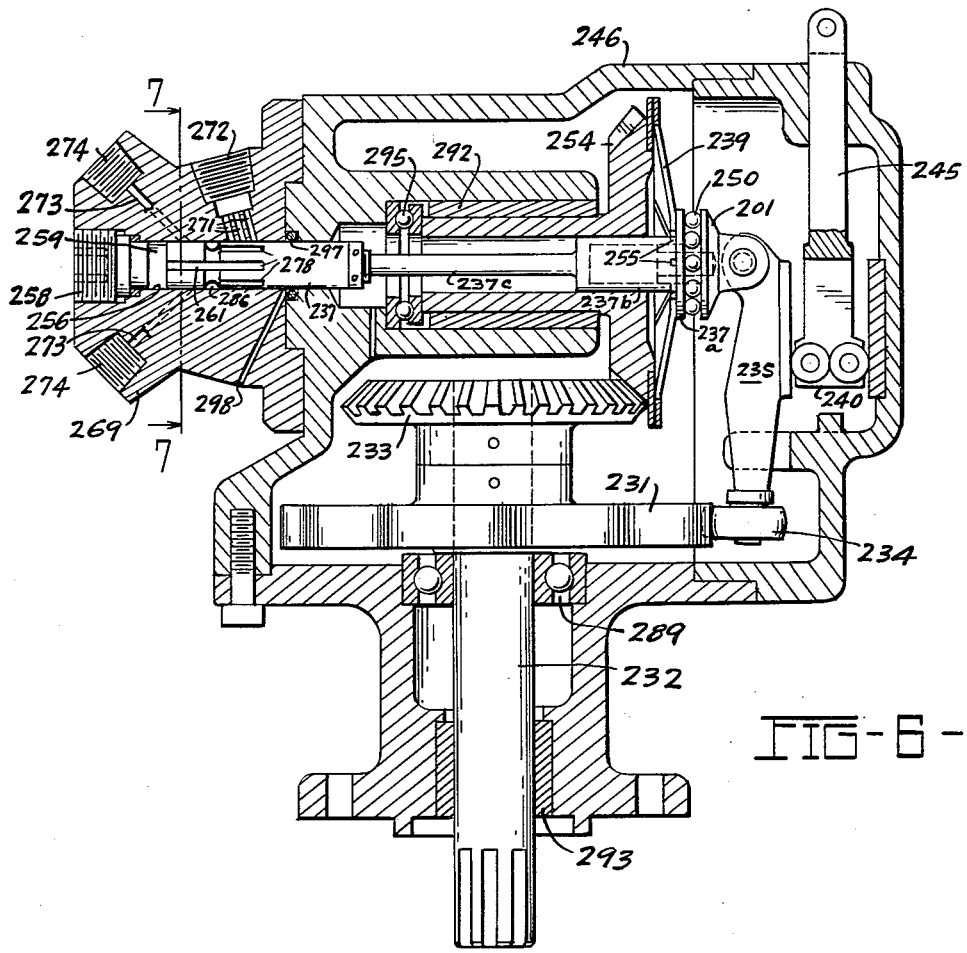
FIG-6-
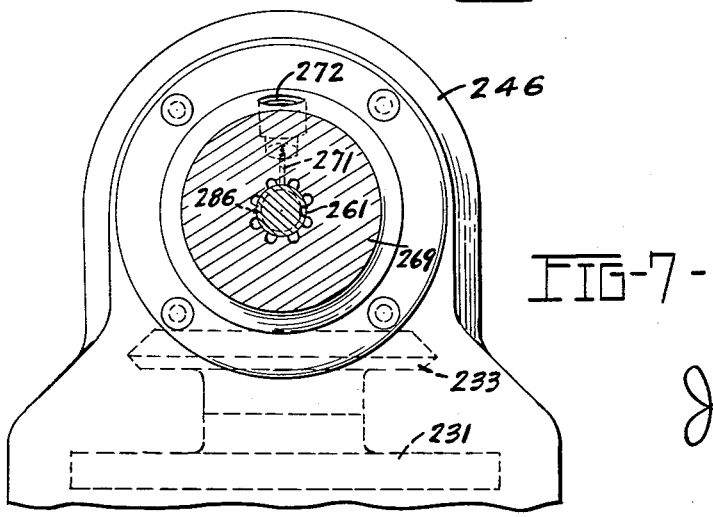
FIG-7-
INVENTOR:
James F. Machen

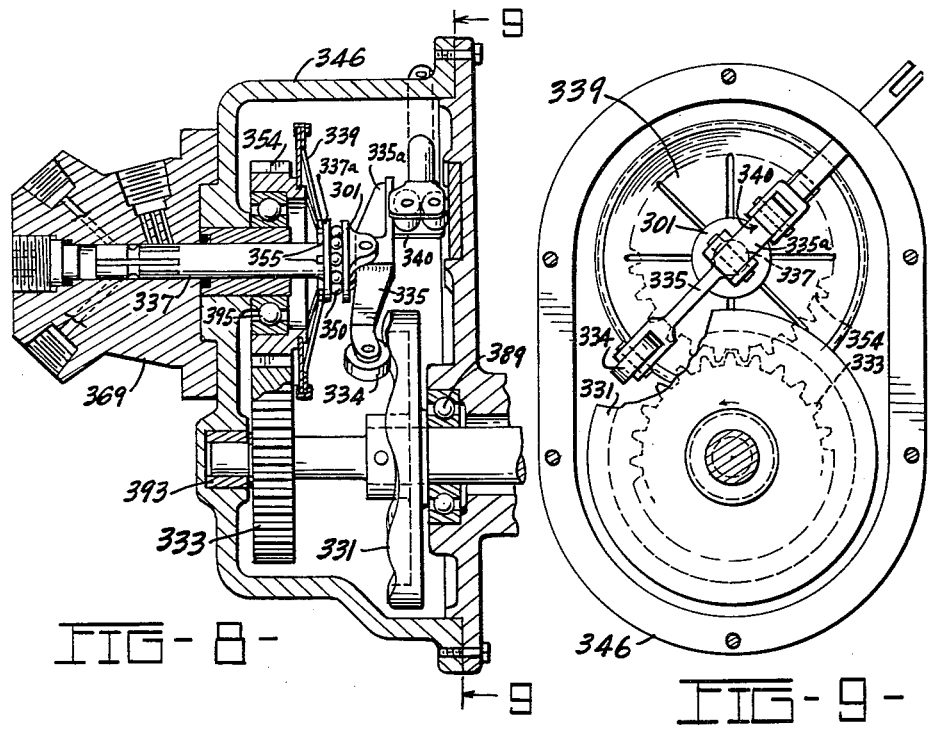
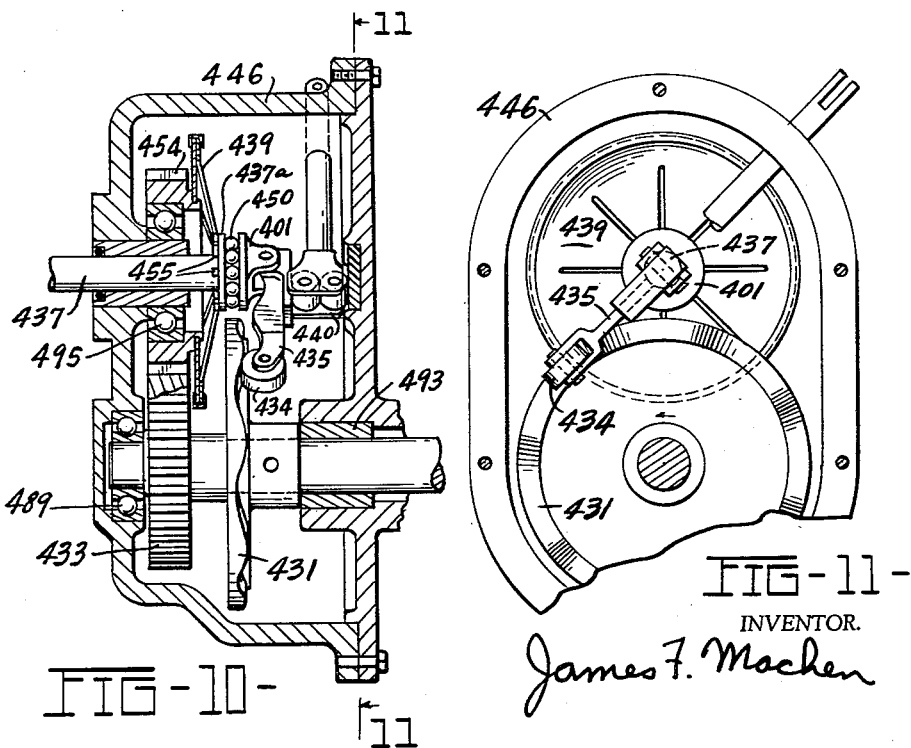

United States Patent Office 3,046,894
Patented July 31, 1962

3,046,894
METERING PUMP MECHANISM
James F. Machen, Toledo, Ohio, assignor to Simmonds Aerocessories, Inc., Tarrytown, N.Y., a corporation of New York
Filed Jan. 27, 1960, Ser. No. 5,027
2 Claims. (Cl. 103—2)

This invention relates to metering pumps and more specifically to variable stroke mechanisms for metering pumps, primarily those related to fuel injection.

In a reciprocating metering pump such as a fuel injection pump, a measured volume of fuel is injected during each forward stroke of the pumping plunger. This volume can be controlled either by by-passing a part of the fuel from the pumping chamber during a portion of the pumping stroke, as desired or by varying the stroke of the pumping plunger as desired.

The former method is common with most diesel and other fuel injection equipment employs a plunger fitted to its mating bore with an extremely close fit. Accurately located valve ports and carefully contoured slots determine the amount of by-pass and cut-off timing, and thus affect metering.

There are many problems concerning the use of this former method which are related to metering accuracy. Since the parts are small and contours and locations are critical, they must be highly precise. This makes the equipment costly. Furthermore, wear and erosion rapidly and appreciably modify this initial precision.

When this type of equipment is used on multicylinder engines, variations in fuel metered from cylinder to cylinder can result in poor engine performance.

The use of a variable stroke to control the volume of fuel metered is less common in present day practice. However, if a suitable variable stroke pump were available it would offer many advantages. The common fault of most variable stroke metering devices is that a proportion of the forces required to inject the fuel is transmitted into the variable stroke control linkage with resultant difficulties, especially with the sensitive type of control device commonly required for Otto cycle fuel injection systems.

Accordingly, it is an object of this invention to provide a fuel metering pump having a very high degree of metering accuracy.

Another object of this invention is to provide a metering pump which retains a high degree of metering accuracy after long service.

Another object of this invention is to provide a metering pump which is simple, compact, and inexpensive and yet dependable, rugged and serviceable.

Another object of this invention is to provide a metering pump which is readily adaptable to different engines.

Another object of this invention is to provide a metering pump which does not require a fuel by-pass.

Another object of this invention is to provide a metering pump having a maximum number of interchangeable parts.

Another object of this invention is to provide a variable stroke metering pump requiring negligible control forces.

Other objects and advantages of the invention will be more apparent from the following description taken in connection with the following drawings, in which:

FIG. 1 is a sectional view of a preferred embodiment of this invention operating a pumping plunger of the type specified in my co-pending application for a Metering Pump, Serial Number 798,125, filed March 9, 1959;

FIG. 2 is a front view of the pump of FIG. 1 at a somewhat reduced scale;

FIG. 3 is a view of the stamped radial leaf spring of FIG. 1;

FIG. 4 is a sectional view of another embodiment of this invention with a control unit applied thereto;

FIG. 5 is a schematic diagram of a fuel injection system, including the pump of FIG. 4, as applied to a spark ignition internal combustion engine;

FIG. 6 is a third embodiment of this invention having a lapped and fitted plunger;

FIG 7 is a sectional view taken through the pumping head of the pump of FIG. 6;

FIG. 8 is a sectional view of a fourth embodiment of this invention;

FIG. 9 is a view of the pump of FIG. 8 taken along the line 9—9;

FIG. 10 is a sectional view of a fifth embodiment of this invention;

FIG. 11 is a fragmental view of the pump of FIG. 10 taken along the line 11—11.

Cam 31, mounted on shaft 32 also having bevel gear 33, actuates reciprocating follower 34 which in turn oscillates rocking beam 35. Spring 36 urges rocking beam 35 against follower 34 and thus follower 34 is forced to ride cam 31. Rocking beam 35 is pivoted to reciprocating plunger 37 by means of pin 38. Stamped radial-leaf spring 39 serves to return plunger 37, and to urge rocking beam 35 against fulcrum 40 about which it oscillates. Fulcrum 40 includes hardened steel rollers 41 and 42 mounted in forked holder 44 by means of pins 43. Control rod 45 extends from holder 44 to the outside of housing 46 through bore 47. When control rod 45 is moved, moving fulcrum 40, roller 41 rolls on flat surface 48 of rocking beam 35, roller 42 rolls on flat surface of hardened smooth steel insert 49, and the periphery of rollers 41 and 42 revolve in face-to-face relation. As the position of fulcrum 40 is changed, the percentage of the total travel of follower 34 derived from cam 31 that is transmitted to plunger 37 by rocking beam 35 is thus varied. Thus, when fulcrum 40 is at the centerline of plunger 37, the stroke of plunger 37 is essentially zero and when fulcrum 40 is half way between the centerline of plunger 37 and the centerline of follower 34, the stroke of plunger 37 approximates the stroke of follower 34. Stop 50 prevents over travel of fulcrum 40.

The rocking beam variable stroke mechanism and its rolling fulcrum have many subtle advantages easily overlooked. Even though at any one instant there may be a component of the pumping or return spring forces transmitted to control rod 45 due to the angularity of rocking beam 35, these forces are cyclically reversing and their net effect is zero when the surface of plate 49 is parallel to the mean position of rocking beam 35. When there is appreciable mass associated with control rod 45 there is little tendency for it to wiggle even at very low speeds.

Since rollers 41 and 42 of fulcrum 40 are in peripheral contact the friction associated therewith is obviously reduced to a low degree. What is not as obvious is the fact that even this low degree of control friction is virtually eliminated by the vibrations present in operation. Another inherent advantage of this variable stroke mechanism is that a relatively large fulcrum travel can be made to give a small change in the stroke of plunger 37. Also, the control achieved is smooth, stepless and completely predictable. Even small manufacturing variations and nominal wear have almost no effect. All of these factors contribute to a very high degree of metering accuracy.

The operation of the pump in the first embodiment and the nature of its various related elements will now be described. Plunger 37 reciprocates in bore 51 of barrel 52 which passes concentrically through hub 53 of bevel gear 54 in mesh with gear 33. Barrel 52 is keyed to hub 53 by means of key 55. Barrel 52 also has reduced diameter bore 56 which contains piston 57. End of bore 56 is closed off by sealed plug 58 to form pumping chamber 59. Annular chamber 60 is formed when piston 57 extends into bore 51 against plunger 37. Drilled passage 61 extends from chamber 59 to frustro-conical distributor valve interface 62 between barrel 52 and valve block 63. Valve block 63 contains inlet passages 64 and outlet passages 65 and is located concentric to and perpendicular with the axis of rotation of barrel 52 by recess 66. Inlet passages 64 join interface 62 with semi-toroidal depression 67 on opposite side of valve block 63 which mates a corresponding semi-toroidal depression 68 in head piece 69 forming a toroidal inlet manifold chamber 70. Passages 71 in head piece 69 join inlet 72 with chamber 70. Passages 73 join outlets 74 with corresponding outlet passages 65 in valve block 63. Gasket 75 seals head piece 69 to valve block preventing leakage.

The fluid pumping principles underlying the operation of this pump are disclosed in detail in my co-pending application Serial Number 798,125 mentioned previously. In FIG. 1, these principles are applied in the construction shown where chamber 60 contains lube-oil supplied from sump 76 in bottom of housing 46. As plunger 37 advances into bore 51, the hydraulic pressure of the lube-oil in chamber 60 increases until piston 57 separates from plunger 37. This separation is very small, sufficient only to allow excess lube-oil to escape through passage 77 into hollow plunger 37 and back to sump 76. With this arrangement the pressure of the lube-oil in chamber 60 will never be less than that in pumping chamber 59 and the fluid being pumped will have no tendency to leak past piston 57 from pumping chamber 59.

In order to supply lube-oil to chamber 60, slots 78 arranged in the free end of reciprocable plunger 37 are located so as to successively line up with lube-oil inlet 79 (as barrel 52 rotates relative to plunger 37) only as plunger 37 withdraws from bore 51 on its intake strokes. The number of slots 78 around plunger 37 is the same as the number of intake strokes plunger 37 makes per revolution of gear 54. Lube-oil is supplied to inlet 79 under pressure by the pumping action of follower 34 in stepped bore 80. Change in diameter of follower 34 at shoulder 81, and fit of follower to bore 80 from closed annular chamber 82 which has an increasing volume as follower 34 moves outward on injection stroke of plunger 37, and decreasing on the intake stroke of plunger 37. During the former, lube-oil is allowed to enter chamber 82 from sump 76 through passage 83, through check valve 84, and into chamber 82. During the latter, lube-oil is forced from chamber 82, through drilled passage 85, into groove 86 in rotating sleeve gear hub 53, through drilled passage 87 and hole 88 in hub 53, and finally into inlet 79. Plugs 89 and 90 prevent leakage of lube-oil from drilled passages 85 and 87, respectively. Close fit 91 between hub 53 and bore 92 minimizes escape of lube-oil from groove 86. The displacement of chamber 82 is made larger than the displacement of chamber 60 to allow for the small amount of leakage that might occur. Any excess lube-oil will be by-passed through passage 77 as before. A nominal inlet pressure in chamber 59 is required in the fluid being pumped to urge piston 57 against plunger 37 during the intake stroke, otherwise they will not remain together. Magnetic attraction between piston 57 and plunger 37 may be used in cases where low inlet pressure is necessary.

The bevel gears 54 and 33 have a 2:1 ratio. Thus there would be half as many lobes on cam 31 as outlets 74. If the pump of FIG. 1 was used as a fuel injection pump on an eight cylinder four-cycle internal combustion engine, shaft 32 would turn at crank shaft speed, and cam 31 would have four lobes.

Also in FIG. 1, sleeve bearing 93 is provided for shaft 32. Spline 94 provides a means of driving the pump. Ball bearing 95 locates gear 54, and mating barrel 52. Stamped spring 96 forces sleeve into contact with valve block 63 to provide a good seal at interface 62. Oil seal 97 prevents leakage of lube-oil past barrel 52. Passages 98 and 99 provide vents and drainage for any seepage past interface 62. Pin 100 provides angular alignment for valve block 63.

Valve block 63 may be made out of a hard carbon-graphite material or porcelain, while barrel 52 may be made of hardened steel or the like. Other parts may be made out of any suitable material.

FIGS. 4 and 5 show a configuration adapted for a spark ignition internal combustion engine. Manifold density type control unit 110 contains evacuated bellows 101 which actuates rod 102 having substantially wedge-shaped control cam 103. Reduced pressure normally in intake manifold 104 of spark ignition internal combustion engine 105 is transmitted to chamber 106 surrounding bellows 101 in control 110 from orifice 107 and through passage 108 communicating with extension 108a. The position of control cam 103 is thus affected by the engine manifold pressure. Valved by-pass 109 is used to obtain idle fuel control by providing an adjustment of the pressure in chamber 106. Port 111 of by-pass 109 is exposed to atmospheric pressure only when throttle plate 112 is essentially in the idle position (as shown). At other throttle settings, by-pass 109 does not appreciably modify chamber 106 pressure.

In providing an injection response to position of cam 103, L shaped roller follower arm 113 pivots about fixed pivot 114. One end of control lever 115 is pinned to follower arm 113 by pin 116 and its other end is pinned to control link 145 by pin 117. 117' and 117'' are alternate positions of the joint pinned by pin 117 under various control conditions. Return spring 124 serves to keep roller follower 113 against control cam 103 at all times. Fulcrum 118 for control lever 115 is mounted on slide 119 which changes position in response to the expansion or contraction of temperature bellows 120 sensing the temperature of inlet air according to the vapor pressure of a volatile fluid in bulb 121 transmitted through capillary tube 122.

Contoured slot 123 in control lever 115 for fulcrum 118 provides a means of calibrating control unit 110 with respect to temperature. Slot 123 is shaped to provide a decrease in fuel metered with a rise in inlet air temperature, and simultaneously a decrease in the ratio of the travel of pin 117 to that of pin 116 (or a decreased sensitivity to manifold pressure change) in accordance with calibration requirements.

The contour of control cam 103 provides the means of calibrating the control unit 110 with respect to manifold pressure according to the fuel-air ratio desired. The effective spring rate of bellows 101 including the small effect of return spring 124 is such that the normal operating range of pressures in chamber 106 will cause the total range of bellows expansion and contraction to correspond to the length of control cam 103. In FIG. 4 the bellows is shown in a position approximating that it would occupy with atmospheric pressure in chamber 106.

The pump portion of FIG. 4 is similar in many respects to the pump of FIG. 1. The arrangement and construction of some of the elements are different, but its operation remains essentially the same. In this configuration, power input miter gear 133 drives mating miter gear 154 having integral double face-cam 131 and hub 153 located by bearing 195. Roller follower 134 rides front face of face-cam 131 which in turn oscillates rocking beam 135. Spring 136 urges rocking beam 135 against follower 134. Rocking beam is pivoted to reciprocating plunger 137 by means of pin 138. Coil return spring 139 for plunger 137 has ball thrust bearing 150 to prevent its rotation by gear 154. Fulcrum 140 again has hardened rollers 141 and 142 touching each other and located by pins 143 between halves of control link 145. Roller 141 rolls on hardened surface 148 of rocking beam 135 and roller 142 rolls on hardened insert 149, as before. Plunger 137 reciprocates in bore 151 of barrel 152 which passes concentrically through hub 153. Key 155 prevents relative rotation between gear 154 and barrel 152. Piston 157 fits in reduced diameter bore 156, also in barrel 152. Plug 158 closes end of bore 156 to form pumping chamber 159. Passage 161 extends to interface 162 of barrel 152 and valve block 163. Inlet passages 164 lead from inlet groove 170 to interface 162. Fuel enters inlet 172 under a nominal positive pressure of from 5 to 30 p.s.i. and is fed through inlet passage 171 to groove 170. Outlet passages 165 in valve block 163 lead to corresponding passages 173 in head piece 169 which join with outlets 174. Spring 196 keeps barrel 152 against valve block 163 to insure a good rotating seal.

Similarly, the remaining pumping elements analogous to those of the pump of FIG. 1 are annular chamber 160, lube-oil outlet 177, inlet timing slots 178, lube-oil inlet passages 179, 188, 185, and 183, groove 186, and check valve 184. Bore 180 fitted with plunger 181 forms the lube-oil pump in this configuration. Spring 189 forces plunger 181 to ride rear face of face-cam 131 from which it derives reciprocation.

The fuel injector 130 in the schematic diagram of FIG. 5 is supplied fuel through fuel line 189 from supply tank 125 under pressure developed by pump 126. Any foreign particles present in the fuel are removed by filter 127 and all vapor is removed by vapor removal chamber 128 having return line 199 (optional). Fuel is forced through high pressure lines 194 and injected into engine 105 through individual nozzles 129.

In the configuration shown in FIGS. 6 and 7, characteristic rocking beam 235 now carries a roller 234 which follows disk cam 231. Control rod 245 again controls the stroke of plunger 237 according to the position of fulcrum 240. This configuration uses a lapped plunger 237 which rotates in a mating bore 256 fitting it with an extremely close fit such as is common in many fuel injection pumps. Rocking beam 235 pinned to thrust fitting 201 acts through ball thrust bearing 250 against thrust flange 237a of pilot 237b. Extension rod 237c carries reciprocation to attached plunger 237. Stamped radial-leaf spring 239 exerts a counter-force, returning plunger 237 and urging roller 234 against cam 231. Spring 239 is attached to miter gear 254 driven by input miter gear 233, and rotates plunger 237 by engaging teeth 255 on flange 237a.

The intake of fuel from inlet 272 through passages 271 in pumping head 269 is valved by slots 278 one of which communicates with passages 271 only during the intake stroke of plunger 237. Slots 278 communicate with groove 286 as does distribution slot 261 through which all fuel enters chamber 259 and which valves the outlet of fuel by directing it to the proper one of the outlet passages 273 during the injection stroke of plunger 237. The spacing of the slots 278, the inlet passages 271, and the outlet passages 273 is arranged so that proper timing and distribution is attained on the intake and injection strokes of plunger 237 when its rotation is at engine cam shaft speed. Sealed plug 258 closes off the end of chamber 259. O-ring 297 seals the plunger against leakage of lube-oil. Drain 298 takes care of fuel leakage in minute amounts past plunger which may be recovered by suitable means if desired. Bearings 292 and 295 are provided for gear 254 and bearings 293 and 289 are provided for input shaft 232 which turns cam 231 and gear 233. The unit is enclosed in housing 246.

Referring to FIGS. 8, 9, 10 and 11, two additional configurations are shown. In both configurations the rocking beams, 335 and 435, are disposed tangentially to face cams 331 and 431 and carry cam follower rollers 334 and 434, respectively. In the configuration of FIGS. 8 and 9, roller fulcrum 340 engages extension 335a of rocking beam 335, now a second class lever. The configuration of FIGS. 10 and 11 has the conventional rocking beam 435, a first class lever. In all other major respects, these two configurations are identical. Lapped plungers 337 and 437 rotate as in the configuration of FIGS. 6 and 7. Thrust fittings 301 and 401 locate rocking beams 335 and 435 and transmit reciprocation through ball thrust bearings 350 and 450 to thrust flanges 337a and 437a to actuate plungers 337 and 437. Stamped radial-leaf springs 339 and 439 exert counter-forces, returning plungers 337 and 437 and urging rollers 334 and 434 against their respective cams 331 and 431. Springs 339 and 439 attached to spur gears 354 and 454 driven by input gears 333 and 433 rotate plungers 337 and 437 by engaging teeth 355 and 455 on flanges 337a and 437a.

Fuel pumping head 369 is identical with pumping head 269 of FIGS. 6 and 7. The configuration of FIGS. 10 and 11 utilizes the same pumping head also. Other elements in these two configurations are input shaft bearings 389 and 393; and, 489 and 493. Bearings 395 and 495 are provided for gears 354 and 454. Both units are enclosed in housing 346 and 446 respectively.

It is possible to obtain many other embodiments of this invention other than those shown in the drawings by rearranging the various elements involved. It should therefore be understood that this invention is not limited to the specific constructions shown and described except as so provided in the appended claims. Those skilled in the art will understand that changes may accordingly be made without departing from the principles set forth.

I claim:

1. In a variable-delivery liquid injection pump for an internal combustion engine having a housing and means therein for converting rotary motion to reciprocatory motion and including also a rotating distributor barrel provided with a bore and a reciprocable plunger positioned therein: the combination comprising a head-piece partially recessed in said housing and including an apertured inlet coaxially disposed with respect to said bore and a series of circumferentially disposed outlet apertures; a removable apertured valve block recessed in said housing in face-adjacent relation to said head-piece; said valve block being provided with conduits intersecting said inlet and said outlets in said head-piece; said rotating distributor barrel having a frusto-conical face in rotary engagement with a complemental frusto-conical recess in said valve block and including an angularly disposed bore in communication with the interior of said distributor barrel and said frusto-conical faces serving to feed fuel thereto; said head-piece, valve block and distributor barrel being in appropriate alignment to accommodate fuel flow; a follower, a rocking beam pivotally secured at one end to a reciprocable plunger slidably received in said distributor barrel with the free end thereof in working contact relation with said follower, said follower also serving to pump lubricant from said housing to said reciprocable plunger through said distributor barrel, a cam means to actuate said follower, and reciprocable fulcrum means in rolling contact with said rocking beam and the interior of said housing to vary the stroke of said plunger and drive means associated with said distributor means and said follower for imparting motion thereto.

2. In a variable-delivery liquid injection pump as claimed in claim 1, wherein said housing is provided with gear means mounted in driving relation with said distributor barrel, said housing including means for arresting axial movement of said gear means with respect to said valve block and means reacting between the gear means and the distributor barrel and serving to bias the distributor barrel into rotary sealing engagement with the valve block.

References Cited in the file of this patent

UNITED STATES PATENTS 497,092    Davis  -------------- May 9, 1893

(Other references on following page)

UNITED STATES PATENTS

| | | |
|---|---|---|
| 1,352,637 | Sumner | Sept. 14, 1920 |
| 1,649,356 | Louis | Nov. 15, 1927 |
| 2,119,567 | Williams | June 7, 1938 |
| 2,139,155 | Gernandt | Dec. 6, 1938 |
| 2,183,436 | Towler et al. | Dec. 12, 1939 |
| 2,640,419 | Evans et al. | June 2, 1953 |
| 2,657,631 | Evans | Nov. 3, 1953 |
| 2,685,254 | Muller | Aug. 3, 1954 |

FOREIGN PATENTS

| | | |
|---|---|---|
| 498,648 | Great Britain | Jan. 11, 1939 |
| 880,336 | France | Dec. 28, 1942 |
| 911,452 | Germany | May 13, 1954 |